UNITED STATES PATENT OFFICE.

FRANCIS A. FREETH, OF GREAT CROSBY, AND HERBERT E. COCKSEDGE, OF LONDON, ENGLAND.

PROCESS OF MANUFACTURE OF AMMONIUM NITRATE FROM AMMONIUM SULFATE AND SODIUM NITRATE.

1,051,097.

Specification of Letters Patent. Patented Jan. 21, 1913.

No Drawing.

Application filed June 5, 1911. Serial No. 631,402.

*To all whom it may concern:*

Be it known that we, FRANCIS ARTHUR FREETH and HERBERT EDWIN COCKSEDGE, subjects of the King of Great Britain, residing, respectively, at Great Crosby, in the county of Lancaster, and Herne Hill, S. E., London, both in the Kingdom of England, have invented certain new and useful Improvements in or Relating to the Manufacture of Ammonium Nitrate from Ammonium Sulfate and Sodium Nitrate, of which the following is a specification.

No method has been hitherto known whereby equivalent quantities of pure ammonium nitrate and pure sodium sulfate can be produced by a continuous process by the reaction between equivalent quantities of ammonium sulfate and sodium nitrate.

We have discovered a process whereby, by the reaction between equivalent quantities of ammonium sulfate and sodium nitrate in the presence of a liquor of a certain composition, we can prepare pure or practically pure ammonium nitrate and pure or practically pure sodium sulfate in equivalent quantities and whereby also the liquor in the presence of which the reaction is performed is reproduced at the end of each cycle of operations ready for a fresh cycle.

The process is further distinguished by the fact that no solid other than ammonium nitrate and sodium sulfate is precipitated from solution in any part of the operations.

Our process depends upon the hitherto unknown fact that when a mixture of ammonium sulfate and sodium nitrate in equivalent proportions and in total quantity depending upon the conditions under which the subsequent operations are performed, is added to a solution containing sodium nitrate, ammonium nitrate, and sodium sulfate in proportions which also vary with the conditions under which the reactions are performed, the ammonium sulfate and the sodium nitrate react with formation of sodium sulfate, which is precipitated unmixed with other salts and is removed from the solution at the temperature selected as that at which the reaction is to be performed and for which the composition of the solution in presence of which the reaction takes place and the total quantity of the reacting substances added to it have been adjusted; and that when the solution remaining is diluted with a small quantity of water, the amount of which depends upon the composition of the liquor in presence of which the reaction was performed, and then subsequently cooled to that point for which the composition of the liquors and the preceding operations have been adapted, ammonium nitrate is precipitated in quantity equivalent to that of the sodium sulfate precipitated in the previous operation which after suitable washing to remove mother liquor is pure or practically pure, and the mother liquor remaining after being concentrated by evaporation to an extent sufficient to compensate for the water added just before cooling, has the same composition as the liquor to which the equivalent quantities of sodium nitrate and ammonium sulfate were originally added, and can be subjected to the same cycle of operations with the same results, and so on indefinitely.

It is to be understood that where the phrases "temperature of reaction," "temperature at which the reaction is performed" are used, they mean the temperature at which the sodium sulfate precipitated by the reaction is removed from the solution; during the time that the reaction is proceeding the temperature need not necessarily be the same as this. In the same way the temperature to which the liquor is cooled for separation of ammonium nitrate means the temperature at which the ammonium nitrate precipitated by the cooling is removed from the solution.

Our process is conducted as follows: Having decided upon (*a*) the temperature at which the reaction is to be performed, (*b*) the temperature to which the liquor is to be subsequently cooled for separation of ammonium nitrate, the initial operation consists in preparing a solution saturated with respect to ammonium nitrate and sodium nitrate at the temperature to which the liquor resulting from subsequent operations is to be cooled for separation of ammonium nitrate and adding to this sodium sulfate until no more will dissolve at that same temperature,—that is, until the double salt $$3NH_4NO_3.(NH_4)_2SO_4$$

just begins to form. This solution is saturated with respect to ammonium nitrate, sodium nitrate and the double salt $$3NH_4NO_3.(NH_4)_2SO_4$$

at the above temperature and will be referred to as the nucleus solution. The nucleus solution is then raised to the temperature at which the reaction is to be performed and equivalent quantities of ammonium sulfate and sodium nitrate are added, with stirring, in such quantity that, after the reaction is finished the ratio of sodium nitrate to ammonium nitrate in the resulting solution at the temperature of reaction is the same as that which obtains in a solution saturated at the temperature of reaction with respect to the double salt $$3NH_4NO_3.(NH_4)_2SO_4$$

and with sodium sulfate, when such solution contains sodium nitrate and sodium sulfate in the same ratio as obtains in the nucleus solution. The stirring is continued and the mixture concentrated by evaporation until the ratio of sodium nitrate to sodium sulfate in solution is actually the same as that of the nucleus solution, the change in ratio being effected by the further deposition of sodium sulfate. The precipitated sodium sulfate is then separated from the solution at the temperature of reaction and washed to free it from adherent mother liquor, when it is practically free from admixture with other salts. To the solution remaining, water is added until the ratio of water to sodium nitrate is the same as that which obtained in the nucleus solution. This solution is then cooled to the temperature originally decided upon for separation of ammonium nitrate; the ammonium nitrate precipitated is separated from the solution at that temperature, washed with a saturated or partially saturated solution of ammonium nitrate to free it from adherent mother liquor and dried by any well-known means, when it is pure or practically pure. The mother liquor remaining then has the same or practically the same composition as the original nucleus solution; it is subjected to a fresh cycle of operations by being concentrated by evaporation to an extent sufficient to remove a quantity of water equal to that which was added in the previous cycle after separation of the precipitated sodium sulfate and to compensate for any dilution which may have been caused by wash liquors or otherwise. To the liquor, either before, during or after concentration, equivalent quantities of ammonium sulfate and sodium nitrate are added to an amount equivalent to the ammonium nitrate which has been removed by cooling in the previous cycle, except that it may be necessary to make some slight adjustment of the quantities to compensate for addition of wash liquors, etc. The reaction proceeds as before, and the sodium sulfate and ammonium nitrate are formed and recovered as previously described. This cycle of operations may be repeated indefinitely, or until the liquors have become so impure that it is necessary to renew them. If the temperature at which the ammonium nitrate is removed from the solution is always kept the same, the mother liquor resulting from it always has the same composition and requires the same treatment to prepare it for another cycle.

We have found, as already mentioned, that the process is best performed under such conditions that in the solution remaining after separation at the temperature of reaction of the sodium sulfate (resulting from the reaction between the equivalent quantities of ammonium sulfate and sodium nitrate added to the nucleus solution with which the process starts, or in subsequent cycles, to the mother liquor after separation of ammonium nitrate), the same ratio of sodium sulfate to sodium nitrate obtains at the temperature of reaction as obtains in the mother liquor resulting from the operation of cooling and separation of ammonium nitrate, that liquor being saturated with respect to ammonium nitrate and also saturated or practically saturated with respect to sodium nitrate and with the double salt $$3NH_4NO_3.(NH_4)_2SO_4$$

at the temperature to which the liquor was cooled. This ratio necessitates the addition of the minimum quantity of water before cooling, but the process may be worked with a somewhat different proportion of sodium nitrate to sodium sulfate at the cost of an increased addition of water before cooling and consequently of greater evaporation subsequently. If, for any reason, such as the addition of too much water, the ammonium nitrate separated from the solution on cooling is less than that quantity which is equivalent to the sodium sulfate separated in the same cycle, then correspondingly smaller equivalent quantities of ammonium sulfate and sodium nitrate must be added to the mother liquor in the succeeding cycle, otherwise the double salt $$3NH_4NO_3.(NH_4)_2SO_4$$

would separate out with the sodium sulfate and contaminate it.

*Examples.*

(A.) When the temperature at which the reaction is to be performed is 45° centigrade, and the temperature to which the liquor is to be cooled subsequently for separation of ammonium nitrate is 20° centigrade then the nucleus solution, prepared as already described, should have the following composition: for every 100 parts by weight of water, 186 parts by weight of ammonium nitrate, 56.9 of sodium nitrate and 22.7 of sodium sulfate, this solution being saturated with respect to ammonium nitrate, sodium nitrate and the double salt $$3NH_4NO_3 \cdot (NH_4)_2SO_4$$

at 20° C. This solution is then raised to about the temperature of the reaction and 41.9 parts or ammonium sulfate and 53.9 parts of sodium nitrate are added to it, the mixture stirred, and when the reaction is completed or while it is proceeding 23.1 parts of water are evaporated from it for every 100 parts of water originally present. The sodium sulfate precipitated is then separated at 45° centigrade and to the solution remaining water is added until the ratio of sodium nitrate to water is the same as it was in the original nucleus solution. This liquor is then cooled to 20° centigrade, when it deposits 50.8 parts by weight of ammonium nitrate for every 100 parts by weight of water contained in it. The ammonium nitrate deposited is separated from the solution at 20° centigrade and the mother liquor remaining then has the same composition as the original nucleus solution and is employed for a fresh cycle of operations as already explained.

(B.) When the reaction is to be performed at 40° centigrade and the temperature to which the liquor is to be cooled for separation of ammonium nitrate is 20° centigrade, a nucleus solution is prepared identical in composition with that given in example A. To it, at about the temperature of reaction are added 34.2 parts of ammonium sulfate and 44 parts of sodium nitrate per 100 parts of water present in it and 16.3 parts of water per 100 contained in it are evaporated from it. After removal of the precipitated sodium sulfate at 40° centigrade, water is added to the liquor remaining until the ratio of water to sodium nitrate is the same as that of the nucleus solution; this liquor is then cooled to 20° centigrade when 41.4 parts of ammonium nitrate are deposited per 100 parts of water contained in it. The ammonium nitrate deposited is separated from the solution at 20° centigrade, and the mother liquor remaining has the same composition as the original nucleus solution and is employed for a fresh cycle of operations as already explained.

We declare that what we claim is:

1. The process for manufacturing practically pure ammonium nitrate from ammonium sulfate and sodium nitrate, which consists in preparing a solution (hereafter called the nucleus solution) saturated with respect to ammonium nitrate and sodium nitrate at the temperature to which the liquor resulting from subsequent operations is arranged to be cooled for separating the ammonium nitrate, and adding to this, sodium sulfate, until no more will dissolve at that same temperature, that is, until the double salt $$3(NH_4NO_3)(NH_4)_2SO_4$$

just begins to form, raising the temperature of this nucleus solution to the temperature at which it has been arranged the reaction shall be performed, and adding equivalent quantities of ammonium sulfate and sodium nitrate with stirring, in such quantity that after the reaction is finished, the ratio of sodium nitrate to ammonium nitrate in the resulting solution at the temperature of reaction, is the same as that which obtains in a solution saturated at the temperature of reaction with respect to the double salt $$3(NH_4NO_3)(NH_4)_2SO_4,$$

and with sodium sulfate, when such solution contains sodium nitrate and sodium sulfate in the same ratio as obtains in the nucleus solution; continuing the stirring and concentrating the mixture by evaporation until the ratio of sodium nitrate to sodium sulfate in solution is actually the same or nearly the same as that in the nucleus solution employed, thereby precipitating sodium sulfate; separating the precipitated sodium sulfate from the solution at the temperature originally decided upon, and for which the quantities and composition of the liquors employed have been adjusted, and washing the sodium sulfate to remove adherent mother liquor; adding water to the solution from which the precipitated sodium sulfate has been removed until the ratio of water to sodium nitrate is the same as, or slightly greater than that which obtained in the original nucleus solution employed; cooling the resulting solution to the temperature originally decided upon for separation of ammonium nitrate, for which temperature the quantities and solutions employed have been adapted; separating the precipitated ammonium nitrate from the solution at that temperature, washing it with a substantially saturated solution of ammonium nitrate to free it from adherent mother liquor, and drying it by any well-known means.

2. The improvement in the process for manufacturing practically pure ammonium nitrate from ammonium sulfate and sodium nitrate, which consists in allowing to react in the presence of a solution containing sodium sulfate, sodium nitrate and ammonium nitrate, such quantities of sodium nitrate and ammonium sulfate as will yield when the reaction is finished a solution saturated with respect to sodium sulfate and the double salt $$3(NH_4NO_3)(NH_4)_2SO_4$$

and containing the same ratio of sodium nitrate to sodium sulfate as obtains in a solution saturated with respect to ammonium nitrate, sodium nitrate and the double salt $$3(NH_4NO_3)(NH_4)_2SO_4$$

at the temperature at which it is subsequently proposed to remove the ammonium nitrate formed by the reaction, separating the sodium sulfate at the temperature for which the above quantities and solutions have been adjusted, washing it to remove adherent mother liquor, adding water to the solution from which the precipitated sodium sulfate has been removed until the ratio of water to sodium nitrate is the same as or slightly greater than that which obtains in a solution saturated with respect to ammonium nitrate, sodium nitrate and the double salt $$3(NH_4NO_3)(NH_4)_2SO_4$$

at the temperature of the subsequent removal of ammonium nitrate, cooling the resulting solution to this temperature, separating the precipitated ammonium nitrate, washing it with a substantially saturated solution of ammonium nitrate, drying it by any well-known means and concentrating the remaining mother liquor to an extent sufficient to remove the quantity of extra water added before the precipitation of ammonium nitrate, and repeating this cycle of operations indefinitely.

3. The process for the manufacture of practically pure ammonium nitrate which consists in adding equivalent quantities of ammonium sulfate and sodium nitrate, namely, 41.9 parts of ammonium sulfate and 53.9 parts of sodium nitrate to 342.5 parts of a solution containing 186 parts of ammonium nitrate, 56.9 parts of sodium nitrate, 22.7 parts of sodium sulfate and 76.9 parts of water, stirring the same at a temperature of 45° C., and at the completion of the reaction separating the sodium sulfate formed at that temperature, adding to the mother liquor remaining 23.1 parts of water per 56.9 parts of sodium nitrate present; cooling the same to 20° C., separating the ammonium nitrate formed, washing it with a substantially saturated solution of ammonium nitrate and drying it by any well-known means; concentrating the solution remaining until it has substantially the same composition as the initial solution, and repeating the above operations indefinitely.

In witness whereof, we have hereunto signed our names this 25 day of May 1911, in the presence of two subscribing witnesses.

F. A. FREETH.
H. E. COCKSEDGE.

Witnesses:
H. WILLIAMS,
H. O. DIXON.